Jan. 15, 1935.  C. W. YELM  1,988,292

V-SHAPED BELT

Filed April 2, 1934

Inventor
Charles W. Yelm.
By A. J. O'Brien
Attorney

Patented Jan. 15, 1935

1,988,292

UNITED STATES PATENT OFFICE 1,988,292

V-SHAPED BELT

Charles W. Yelm, Denver, Colo., assignor to The Gates Rubber Company, Denver, Colo., a corporation of Colorado Application April 2, 1934, Serial No. 718,600

6 Claims. (Cl. 74—233)

This invention relates to improvements in belts for the transmission of power and has reference more particularly to side driving belts of the type usually referred to as V-shaped belts.

Where V-shaped belts are employed for the transmission of power they are usually made of comparatively small cross sectional areas and a number of belts employed in parallel, because by this means the belts can be made smaller and will be subjected to less strains than if the entire power was transmitted through a single belt.

It is sometimes desirable and necessary to transmit by a single V-shaped belt a much larger amount of power than is usually so transmitted and this is especially true where a speed changing mechanism is interposed between the prime mover and the machine. In one type of speed change mechanism two V-shaped pulleys are employed, the sides of the grooves of which can be moved towards and away from each other so as to automatically change the speed ratio and the belt that forms the subject of this invention is intended more particularly for use with such speed change apparatus, although it can, of course, be employed in connection with ordinary V-type transmissions.

In a copending application Serial No. 706,495 filed January 13, 1934, a belt of the type disclosed in this application has been shown and described. The belt that forms the subject of the application above identified is provided with means for preventing or resisting transverse flexure of the belt.

This invention differs from the one described and claimed in the application above identified primarily in this, that in addition to the means for resisting transverse flexure means is also provided for automatically maintaining the distance between the outer corners of the belt substantially constant when it is flexed transversely due to the strains to which it is subjected during operation. By the expression "transverse flexure" is meant a bending inwardly of the belt by force from the outside towards the inside, flexure would change the straight inner surface of the belt into a convex surface.

In order to more clearly describe this invention, reference will now be had to the accompanying drawing in which the preferred construction has been illustrated, and in which.

Figure 1:
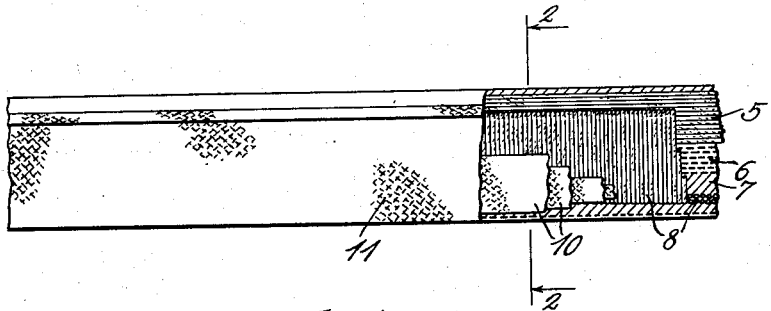
Fig. 1 is a side elevation of the belt looking in the direction of arrow 1, in Fig. 2, a portion of the belt having been broken away to better disclose the construction.
Figure 2:
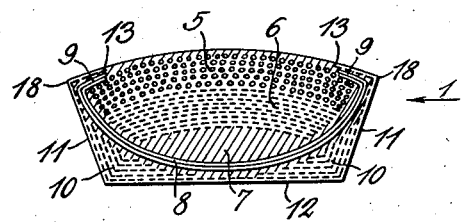
Fig. 2 is a section taken on line 2—2, Fig. 1.
Figure 3:
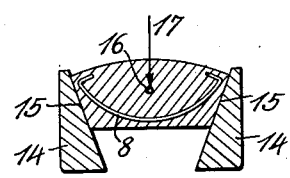
Fig. 3 is a transverse section through the belt and a pulley showing the relative position of the two parts.

The belt that forms the subject of this invention is preferably composed of a number of layers 5 of rubberized cord. In the drawing 5 layers of cord have been shown, but a greater or less number may be employed as occasion may arise. Located on the inside of the cord layers is a plurality of layers 6 of rubberized fabric. This fabric may be bias cut or straight cut, as may be desired, on the inside of the fabric layers a body 7 of rubber composition is preferably provided. A tension arch 8 extends transversely of the belt and is formed from one or more layers of rubberized cords whose upper ends extend over the outer edges of the outer cord layer 5 as indicated by reference numeral 9. Secured to the outside of the tension arch are strips 10 of rubberized fabric and enclosing the driving sides 11 and the inside 12 of the belt is a layer of bias cut rubberized fabric. The outer covering fabric does not extend over the top but preferably terminates at the point indicated by reference numeral 13. When a belt of the shape shown in Fig. 2 is in place in the groove of a pulley having inclined sides, the belt and the pulley form an assembly like than shown in Fig. 3. The pulley indicated in Fig. 3 is preferably provided with two relatively movable parts 14 whose inner or adjacent surfaces 15 are outwardly inclined so as to form friction surfaces against which the inclined sides 11 of the belt rest. In practice the surfaces 15 are slightly convex so as to take care of variations in shape when the radius of curvature of the belt is changed.

Figure 4:
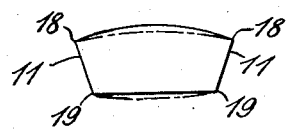
Fig. 4 is a diagram showing the change that takes place in the cross section of the belt when it is subjected to strains during operation.

When the belt is in place in the pulley as shown in Fig. 3 and subjected to tensional strains the resultant of these strains can be supposed to be centered at point 16 and acts in the direction of the arrow 17. Such strains tend to flex the belt transversely. Such flexure is resisted by the tension arch 8 but since the belt is made from rubberized fibrous material and rubber composition, it will yield and assume a shape somewhat like that indicated in dot and dash lines in Fig. 4. If no means is provided to expand the transverse dimension of the belt near its outer surface, the outer corners, which have been designated by reference numerals 18 in Fig. 4, will move inwardly and if this occurs the pressure of the sides 11 will decrease from the inner corners 19 to the outer corners 18 and this variation in pressure would be highly undesirable. To prevent the inclination of the sides of the belt from changing to any appreciable extent when transversely flexed, the layers 5 of cord and the layers 6 of rubberized fabric have been bowed outwardly so as to form arches that tend to move the corners 18 outwardly when these arches are straightened. By properly arching the materials in layers 5 and 6, it is possible to produce a belt that will not change the inclination of the sides 11 when it is transversely flexed.

It is also well known that when any extensible material is subjected to tensional strains, there is a tendency to decrease the cross sectional area and change the shape of the cross section in ways depending upon the original shape. This effect is known as the Poisson effect and with belts of this type, there is a tendency to decrease the distance between the outer corners when tension is applied, even if there is no transverse flexure. Such deformation due to tension alone will, however, tend to flatten the arches 5 and 6 and the expansion that will be caused thereby will neutralize the contraction that would otherwise take place so that the inclination of the sides 11 will remain the same, even if considerable tension is applied to the belt.

It will be seen from the above description that the belt that forms the subject of this invention is so constructed that the inclination of the sides 11 will be retained substantially constant at varying loads between reasonable limits and that this property is attained by the employment of a tension arch 8 and compression arches 5 and 6. It is, of course, possible to dispense with the rubberized fabric layers 6 in which case the rubberized cord layers 5 would be the compression arch.

In a wide V-shaped belt of the type to which this belongs and which is constructed with a flat layer or layers of cord, the tension in the cords adjacent the center will diminish when the belt is flexed transversely and the strains will be transferred to the cords nearer the edges, thereby producing a variable distribution of tensional strains that tend to break down the cords near the edges sooner than if the strains were uniformly distributed.

In the present construction the transverse flexure is resisted by the tension and the compression arches, as above explained, and this serves to maintain a more uniform distribution of tension in the cords with a result that the belts last longer and give better service than similar belts that do not have the compression arch feature.

Although the inverted suspension arch 8 is desirable, good effects can be obtained without this element as the straightening of the compression arches will tend to keep the pressure between the sides 11 and 12 equal at all times, but the tension arch is considered to be a useful element in this combination and is very effective for the purpose of preventing transverse flexure.

Having described the invention what is claimed as new is:

1. A power transmission belt of the side driving V-shaped type and of greater width than thickness, the body of the belt comprising a layer of cord extending in the direction of the length of the belt and located near the outer surface thereof to resist tension, said layer being continuously curved outwardly when viewed in a plane transverse to the belt, a center of double convex cross section located on the inside of the cord layer and a layer of cord fabric extending transversely of the belt and resting against the convex inner surface of the center, the ends of the cords terminating near the outer corners of the belt, the belt being moulded into the shape desired.

2. A power transmission belt of the side driving V-shaped type and of greater width than thickness, the body of the belt comprising a layer of cord extending in the direction of the length of the belt and located near the outer surface thereof to resist tension, said layer being continuously curved outwardly when viewed in a plane transverse to the belt, a center of double convex cross section located on the inside of the cord layer, a layer of cord fabric extending transversely of the belt and resting against the convex inner surface of the center, the ends of the cords terminating near the outer corners of the belt, the belt being moulded into the shape desired, and a fabric covering for the inner surface and the inclined driving surfaces of the belt.

3. A power transmission belt of greater width than thickness of the side driving V-shaped type, said belt comprising an elongated inner body of readily deformable material whose transverse cross section is convexo convex, a layer of substantially parallel cords located on the outside of said body with the cords extending in the direction of its length, a layer of cords extending transversely of the body and lying along its inner convex surface, the ends of the last named cord layer terminating adjacent the outer corners of the belt.

4. A power transmission belt of the side-driving V-shaped type and of greater width than thickness, the belt having a layer of longitudinally extending cords whose transverse section is a continuously curved outwardly bowed arch and which constitutes a means for maintaining the distance between the outer corners of the belt substantially constant when it is bent inwardly, an inverted tension arch formed from a layer of transversely extending cords continuously curved inwardly and embedded in the material of the belt and which resists forces tending to bend the belt inwardly, the space between the concave inner surface of the longitudinally extending cord layer and the concave surface of the layer of transversely extending cords, which form a tension arch, having a filling of readily deformable material comprising a rubber composition.

5. A power transmission belt of the side driving V-shaped type and of greater width than thickness composed of rubber composition and rubberized fibrous material, the belt having a layer of cord embedded therein and extending across the belt from between the outer corners thereof, the layer being continuously bowed towards the inside of the belt to form a tension arch, and a layer of longitudinally extending cords adjacent the outer surface of the belt for resisting longitudinal stresses, the inner surface of the last named cord layer being transversely concave, a filling of readily deformable material comprising rubber composition between the two cord layers, the outer surface of the belt being transversely convex whereby it will maintain a substantially constant width when it is flattened by tensional strains.

6. A power transmission belt of the side-driving V-shape type and of greater width than thickness, the body of the belt comprising a layer of cord extending longitudinally and located adjacent the outer surface thereof, a layer of rubberized fabric located inside of the cord, a layer of cord extending transversely of the belt from the outer corners, the transversely extending cords being on the inside of the cord and fabric assembly, and rubberized fabric and rubber composition on the inside of the transverse cord, the belt being moulded into the shape desired and the driving sides and the inside covered with bias cut rubberized fabric.

CHARLES W. YELM.